United States Patent
Greub et al.

(10) Patent No.: US 8,942,532 B2
(45) Date of Patent: Jan. 27, 2015

(54) PLUG-IN DEVICE FOR AN OPTICAL CABLE

(75) Inventors: Daniel Greub, St. Gallen (CH); Michael Lothar Völker, Sax (CH); Leo Bollhalder, Oberbüren (CH)

(73) Assignee: Huber+Suhner AG, Herisau (CH)

( * ) Notice: Subject to any disclaimer, the term of this patent is extended or adjusted under 35 U.S.C. 154(b) by 396 days.

(21) Appl. No.: 13/382,660

(22) PCT Filed: Jun. 11, 2010

(86) PCT No.: PCT/EP2010/058211
§ 371 (c)(1),
(2), (4) Date: Feb. 16, 2012

(87) PCT Pub. No.: WO2011/003693
PCT Pub. Date: Jan. 13, 2011

(65) Prior Publication Data
US 2012/0141086 A1  Jun. 7, 2012

(30) Foreign Application Priority Data

Jul. 6, 2009 (CH) ........................................ 1042/09
Aug. 18, 2009 (CH) ........................................ 1279/09

(51) Int. Cl.
G02B 6/00 (2006.01)
G02B 6/38 (2006.01)
H01R 13/625 (2006.01)

(52) U.S. Cl.
CPC ............ G02B 6/3891 (2013.01); G02B 6/3879 (2013.01); G02B 6/3897 (2013.01); H01R 13/625 (2013.01)
USPC ............................................ 385/139; 385/56

(58) Field of Classification Search
None
See application file for complete search history.

(56) References Cited

U.S. PATENT DOCUMENTS

| | | | |
|---|---|---|---|
| 5,619,610 A * | 4/1997 | King et al. | ..................... 385/139 |
| 6,884,099 B1 | 4/2005 | Cannon | |
| 6,918,704 B2 | 7/2005 | Marrs et al. | |
| 7,281,856 B2 | 10/2007 | Grzegorzewska et al. | |
| 7,338,214 B1 | 3/2008 | Gurreri et al. | |
| 2006/0089049 A1* | 4/2006 | Sedor | ............................ 439/620 |
| 2007/0047877 A1 | 3/2007 | Pepe | |
| 2009/0060420 A1 | 3/2009 | Cull et al. | |

FOREIGN PATENT DOCUMENTS

| | | |
|---|---|---|
| CN | 1519602 A | 8/2004 |
| CN | 101243345 A | 8/2008 |
| EP | 0 154 781 A2 | 9/1985 |
| EP | 0 665 454 A1 | 8/1995 |
| EP | 1 018 660 A2 | 7/2000 |
| EP | 1 043 612 A2 | 10/2000 |
| EP | 1 067 416 A1 | 1/2001 |
| EP | 1 170 830 A1 | 1/2002 |

* cited by examiner

Primary Examiner — Uyen Chau N Le
Assistant Examiner — Chad Smith
(74) Attorney, Agent, or Firm — Pauley Petersen & Erickson

(57) ABSTRACT

The invention relates to a cable gland (1) having a flange (3) and a plug-in part (2) suited for an operational connection to the flange (3). The plug-in part (2) comprises a locking sleeve (4), and a fastener (7) for a connector (8), said fastener being operatively connected to said locking sleeve by way of a control slide (10). The control slide (10) is configured such that a rotation of the locking sleeve (4) around the longitudinal axis (x) of the plug-in part (2) results in an axial displacement of the fastener (7) in a longitudinal direction.

10 Claims, 6 Drawing Sheets

PLUG-IN DEVICE FOR AN OPTICAL CABLE

BACKGROUND OF THE INVENTION

1. Field of the Invention

The invention relates to a cable entry, for example for connecting a fiberoptic cable to a remote radio head (RRH) in a mobile radio antenna.

In mobile communication systems, so-called remote radio heads (RRHs) are used. Said remote radio heads permit a greater distance between the base station and the antenna. The RRHs are generally connected to the base station via fiberoptic lines (fiberoptic cables). In order that the fiberoptic lines can be connected in a simple manner using the connectors fixed thereto, cable entries with holding devices in front of them are used.

2. Discussion of Related Art

Cable entries are known from the prior art. Said cable entries comprise an appliance-side flange with a coupling thread, a fitting opening and a cable-side plug-in part with a union nut, which can be operatively connected to the coupling thread. The flange is fastened on the outside to a housing of an RRH. LC connectors fastened to the cable in the interior of the RRH can be operatively connected to an SFP module, for example, through the fitting opening. The SFP module (also referred to as a mini-GBIC) is a standardized module for network connections. The diameter of the fitting opening is generally of such a size that the SFP module can be pushed through the fitting opening for fitting purposes.

The LC connectors conventionally used and known from the prior art are standardized optical connectors with a basic body with a sprung locking arm which protrudes upwards and towards the rear at an angle and has two locking shoulders which protrude outwards laterally. Whilst being plugged into a socket provided for this purpose, the locking arm is moved downwards, with the result that the locking shoulders snap into cutouts provided for this purpose in the mating piece. In order to be unlocked, the locking arm needs to be pressed against the basic body until the locking shoulders are unlocked. Then, the LC connectors can be withdrawn from the mating piece. Two LC connectors which are arranged laterally next to one another and are connected to one another via a holder are often plugged in or unlocked at the same time. In order for joint unlocking to be possible, the holder in the case of conventional connectors has a clip, by means of which both locking arms can be unlocked at the same time. The clip is arranged behind the locking arms and protrudes forwards and upwards. By virtue of the clip being pressed forwards and downwards onto the locking arms, said locking arms are released. In particular in difficult spatial conditions, unlocking is difficult since the force required for depressing the clip is in the opposite direction to the removal direction.

The cable entries known from the prior art are relatively difficult to fit in the field since the LC connectors first need to be connected to the SFP module. For this purpose, said SFP module needs to be reached through the fitting opening. In the process, care needs to be taken to ensure that the fiberoptic cable or the LC connectors fastened thereto, neither of which have any strain relief at this point in time, are not damaged. Only then can the union nut be screwed onto the thread of the flange. In this case, care additionally needs to be taken to ensure that the cable is not twisted off by the sleeve being screwed on.

U.S. Pat. No. 7,338,214 by Tyco Electronics Corporation was granted in March 2008 and discloses a method and a device for sealing a plug-in part of a cable entry for optical connectors. Two LC connectors can be arranged fixedly in an outer housing of the plug-in part via an adapter. This device has the above-described disadvantages.

EP 1 018 660 A2 by Delphi Technologies Inc. was published in July 2000 and discloses a connecting device for coupling a fiberoptic conductor with an optoelectrical transducer. The device has a base which can be fastened on a printed circuit board. A cable-side connector part can be snapped into an opening, in which it is held by means of a spring.

EP 0 154 781 A2 by AMP Incorporated was published in 1985 and discloses an optical connector arrangement with a housing-side flange part, to which an optical connector can be connected on both sides. The two connectors are aligned coaxially with respect to one another in a fitted state and in the process enter into an operative connection with one another.

The same Applicant has disclosed a cable entry which can be fitted in a simpler manner in comparison with the prior art and which has further improvements. The cable entry has a housing-side flange with a fitting opening for passing through a cable. A boom projecting from the base plate of the flange has a holding device at its opposite end, said holding device being suitable for accommodating a mating piece fitted to the cable before a fastening sleeve is screwed over both of these parts. This provides the possibility of the cable being protected in respect of strain relief before the connectors are connected.

SUMMARY OF THE INVENTION

One object of the invention consists in disclosing a cable entry or a connector which avoids the problems associated with the prior art and can be fitted in a very simple manner.

In difficult conditions, for example when fitting to an antenna mast or in the case of restricted spatial conditions, it is advantageous if the cable entry and the connector can be plugged together and released with a single hand movement. The cable entry should also have a compact physical size and it should be possible for said cable entry to be produced inexpensively. Depending on the application area, the SFP module can also be installed and dismantled easily. It is likewise advantageous if there are no positive forces acting on the SFP module after coupling.

The same applicant has disclosed an improved LC connector which permits unlocking by virtue of a force which is directed towards the rear, in the direction of the cable. The connector has a basic body with a locking arm which protrudes upwards and rearwards at an angle from the basic body. An unlocking element is operatively connected to the locking arm by one or more connectors and can be displaced with respect to the basic body in an unlocking direction in such a way that the locking arm is thus unlocked. The unlocking element is arranged displaceably on the basic body and has operative connection means, by means of which it can be operatively connected to a further holder.

The cable entry according to the invention makes it possible to connect the above-described improved optical LC connector or a suitably designed other connector, for example an RJ-45 or the like, to a mating piece in one operational step and to fasten a strain relief means to a housing substantially at the same time. In contrast to the cable entries known from the prior art which require a plurality of working steps, this represents a considerable simplification.

The cable entry according to the invention generally has a flange, which is intended to be fitted to a housing of an appliance, for example an RRH. If required, the flange can also be integrated in a connector part, with the result that two cables can be operatively connected to one another, for example. The flange has coupling means for a strain relief means and a fitting opening for one or more cables to be connected. The coupling means can be, for example, a thread or a bayonet-type closure or a snap-action device, depending on the configuration.

A cable-side plug-in part has, in the interior, a holder for accommodating at least one connector, for example one of the above-described type. If required, the connectors can be integrated fixedly or replaceably in the holder. For this purpose, the holder likewise has operative connection means, which can be operatively connected to the operative connection means of the connectors.

The holder is moved in a controlled manner in the connector longitudinal direction via a slotted control link and at least one control pin engaging in said slotted control link, or is relieved of load with respect to the locking sleeve, by virtue of a locking sleeve being rotated about the longitudinal direction of the plug-in part. By virtue of the rotation, the coupling means of the plug-in part are at the same time mechanically connected to the coupling means of the flange. The holder arranged in the interior can be mounted in a sprung manner in order to make it possible to compensate for any incorrect positions and inaccuracies in the transverse and/or longitudinal direction during connection.

In one embodiment, a slotted control link is arranged on a cylindrical lateral surface of a control part, which rotates along with the locking sleeve. The holder which can be displaced in the axial direction with respect to the locking sleeve has a pin, which engages in the slotted control link, with the result that, when the control part rotates, the holder moves in the axial direction with respect to the control part. In order that there is no damage to the plug-in part or to a connector inserted therein in the event of an incorrect position, the control part is mounted in a sprung manner in the axial direction. For this purpose, a spring is arranged between the control part and the locking sleeve, it being possible for said spring to also be used for transmitting the rotary movement from the locking sleeve to the control part, if required. As an alternative or in addition, other coupling means can be provided between the locking sleeve and the control part, said locking means primarily preventing undesired rotation of the control part with respect to the locking sleeve.

The embodiment of the invention has a mechanism constructed on a slotted control link in the interior, said mechanism substantially implementing the following steps when the plug-in part is locked with respect to the socket: the plug-in part is positioned onto the flange, with the arranged in the interior of the connector being arranged in an initial position in front of their mating piece. Then, the locking sleeve is rotated about its longitudinal direction (for example in the clockwise direction), with the result that mechanical coupling means are brought into engagement between the locking sleeve and the flange, whereby the locking sleeve is operatively connected mechanically to the flange. The rotary movement of the locking sleeve is transmitted to the control part, which is operatively connected mechanically directly or indirectly, with the result that at least a region of said control part also rotates. The slotted control link which is in engagement with the holder of the connectors converts the rotary movement of the control part into a longitudinal force which is predefined by the shape of the slotted control link, with the spring being a contributory factor, and which acts on the holder such that the at least one connector which is inserted into or integrated in the holder is displaced in the axial direction, or is relieved of load counter to the force of the spring, until it is operatively connected to its mating piece in the intended manner, or is relieved of load. The slotted control link is configured such that, when the connectors are latched in or shortly thereafter, the locking sleeve is also locked with respect to the flange. If required, the spring can be relieved of load by a correspondingly configured slotted control link at the end.

In one embodiment, the slotted control link has a closed, endless configuration. This means that the pin of the holder engaging in said slotted control link follows a different path during locking and unlocking. In this case, the slotted link is matched to the connector which is inserted into or integrated in the holder, with the result that said connectors can be locked and unlocked automatically without any problems.

In a further embodiment, the slotted control link is configured in such a way that it results in the load on the spring tensioned between the connectors, or the holder thereof and the connecting sleeve being relieved.

In order to unlock the plug-in part, the following procedure is followed in simplified form: the locking sleeve is rotated in the opposite direction, with the result that the mechanical operative connection means between the locking sleeve and the socket are controlled. At the same time, the holder engages in a second part of the slotted control link, depending on the embodiment, as a result of which the holder is drawn rearwards in a controlled manner or into the same part of the slotted control link. This movement is transmitted to the connectors which are operatively connected to the holder, and said connectors are thus unlocked and withdrawn from their mating piece. If required, the slotted control link can be integrated in a detent pawl, for example in the form of a tongue protruding inwards in a sprung manner, which ensures that the pin always moves in the prescribed direction through the slotted control link.

In one embodiment, the holder for the connectors is guided in a sprung slotted link, which for its part is pressed into a locking sleeve. If the locking sleeve is screwed onto the flange, the holder is moved forwards owing to the spring pressure of the slotted link and couples the connector(s) to its/their mating piece (for example SFP module). If the locking sleeve is unscrewed, the connector is decoupled owing to the rearward movement of the holder. If necessary, the circumferential direction of the movement of the holder can be determined via a ramp on the slotted link. The torque support for the holder during the coupling and decoupling operation can be provided, for example, via the connectors on their mating piece or, via corresponding geometries engaging one inside the other, directly between the holder and the flange. The flange and/or the locking sleeve can assume the function of orienting, positioning and inserting, in a controlled manner, the connectors and can have seals with respect to environmental influences. The locking sleeve can have a seal and a crimping neck for the cable fastening on the cable side.

The cable entry according to the invention differs from the prior art inter alia in that, for example, fiberoptic LC connectors are not plugged in and unplugged manually as is conventionally the case, but are controlled remotely from the outside via a mechanism. This has the advantage that erroneous control measures can largely be avoided. A further advantage consists in that undefined plug-in positions can be avoided. Position tolerances between the fiberoptic plug and the mating piece can be compensated for automatically. The system is compact since the required coupling excursion is distributed over inner and outer components.

The outer coupling between the locking sleeve and the flange can be produced, depending on the application area, by rotation (thread, bayonet etc.) or longitudinal movement (snapping, push-pull, etc.). The drive for the holder can also be configured so as to be decoupled from the locking sleeve, if required. For example, a longitudinally displaceable sleeve which is operatively connected to the locking sleeve and causes said locking sleeve to perform a rotary movement can be arranged outside the locking sleeve.

In one embodiment, the cable entry has a flange and a plug-in part, which is suitable for operative connection to the flange. The plug-in part has a locking sleeve and a holder for a connector, said holder being operatively connected to said locking sleeve via a slotted control link. The slotted control link is configured in such a way that a rotation of the locking sleeve about the longitudinal axis of the plug-in part brings about an axial displacement of the holder in the longitudinal direction with respect to the locking sleeve. In general, the slotted control link is configured so as to be endless in such a way that the holder performs different longitudinal movements/paths during locking and unlocking of the locking sleeve with respect to the flange in such a way that the connectors are coupled and decoupled to and from the mating piece. In one embodiment, the slotted control link comprises substantially four functional sections. Depending on the application area, other configurations are possible. If required, the slotted control link is arranged on a control part, which is arranged displaceably in the longitudinal direction with respect to the locking sleeve. The control part can be operatively connected to the locking sleeve via a spring. The holder can be suitable for accommodating a connector, which has a basic body and a locking arm which is arranged on said basic body and which can be unlocked via an unlocking element. The locking sleeve can be operatively connected to the flange via a thread. The holder for the connectors can be arranged in rotationally fixed fashion. The control element can be arranged in rotationally fixed fashion with respect to the locking sleeve via an operative connection means.

BRIEF DESCRIPTION OF THE DRAWINGS

The invention will be explained in more detail with reference to exemplary embodiments shown in the following figures, in which.

DESCRIPTION OF PREFERRED EMBODIMENTS

Figure 1:
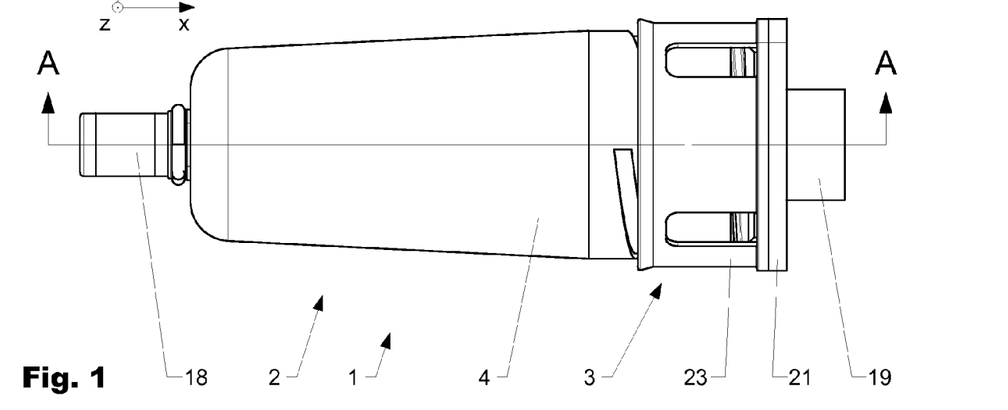
FIG. 1 shows a first embodiment of a cable entry in a plan view.
Figure 2:
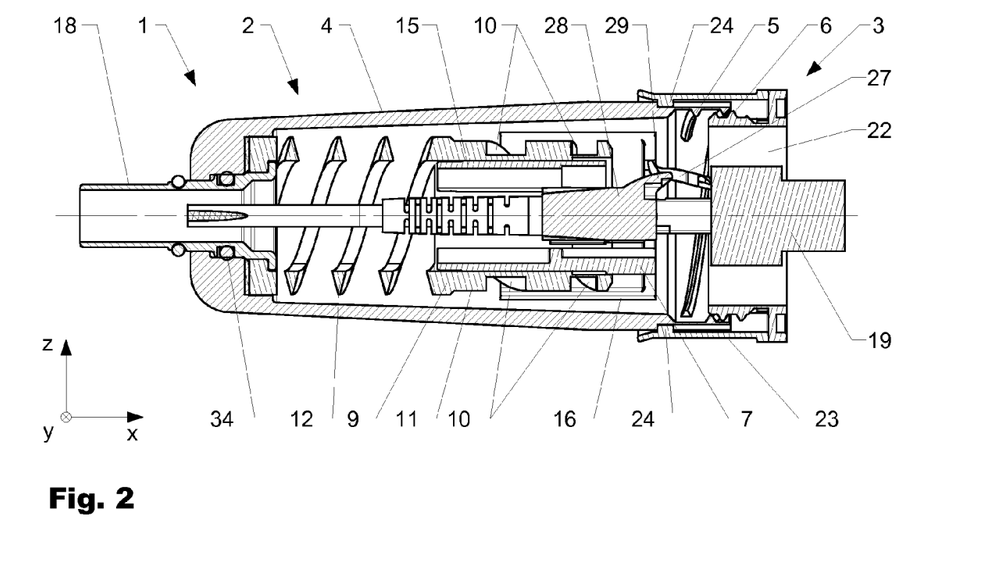
FIG. 2 shows the cable entry in a sectional illustration.
Figure 3:
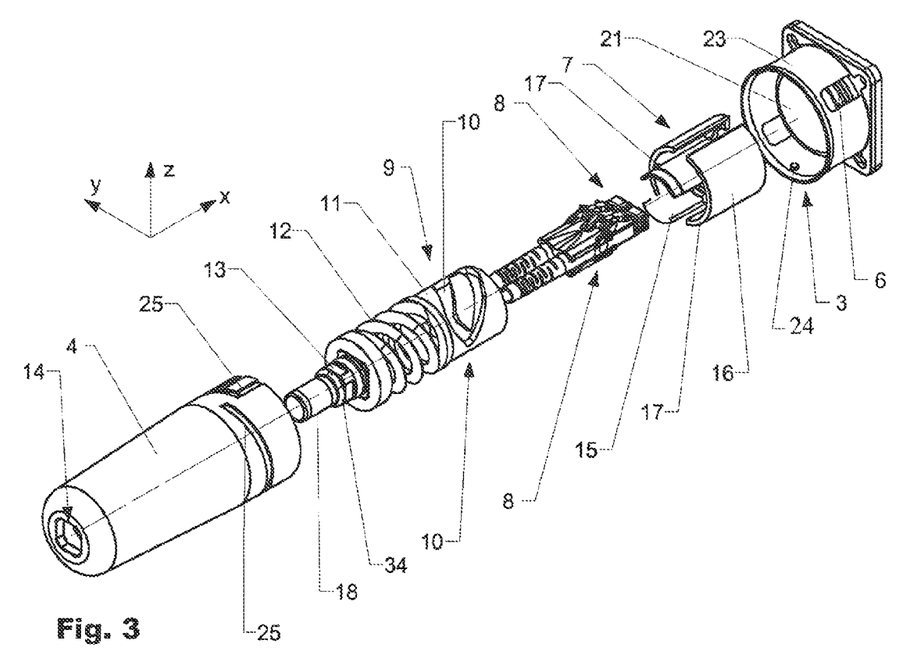
FIG. 3 shows the cable entry in an exploded illustration at an angle from the front.
Figure 4:
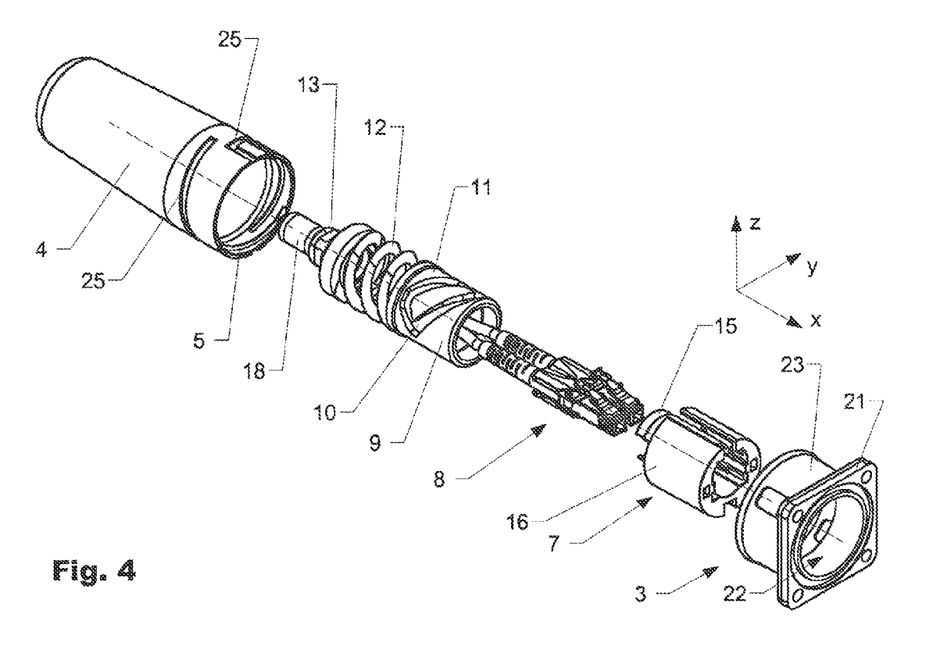
FIG. 4 shows the cable entry in an exploded illustration at an angle from the rear.
Figure 5:
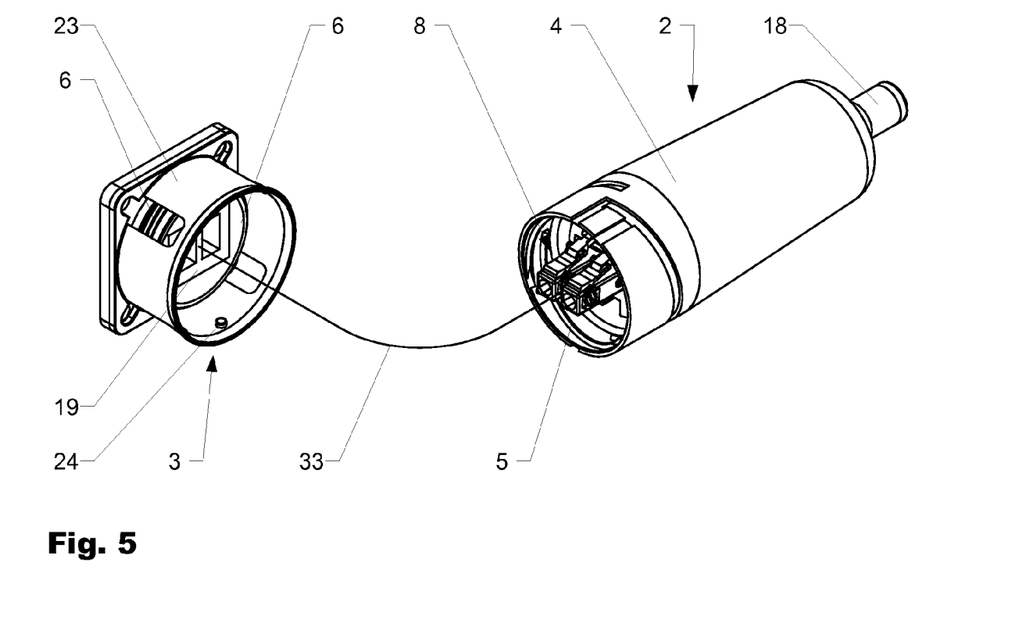
FIG. 5 shows a plug-in part and a socket prior to fitting.
Figure 6:
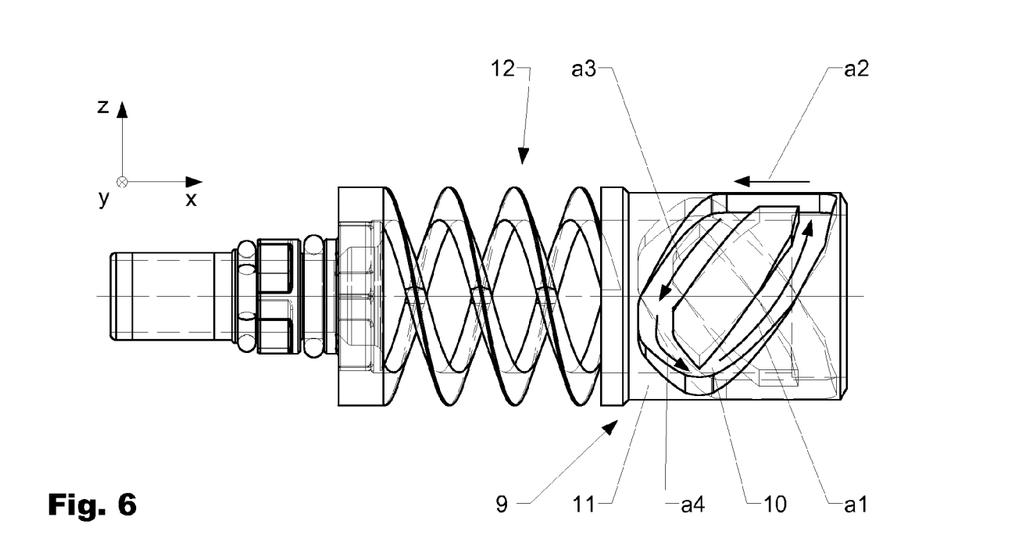
FIG. 6 shows a control part in a side view.
Figure 7:
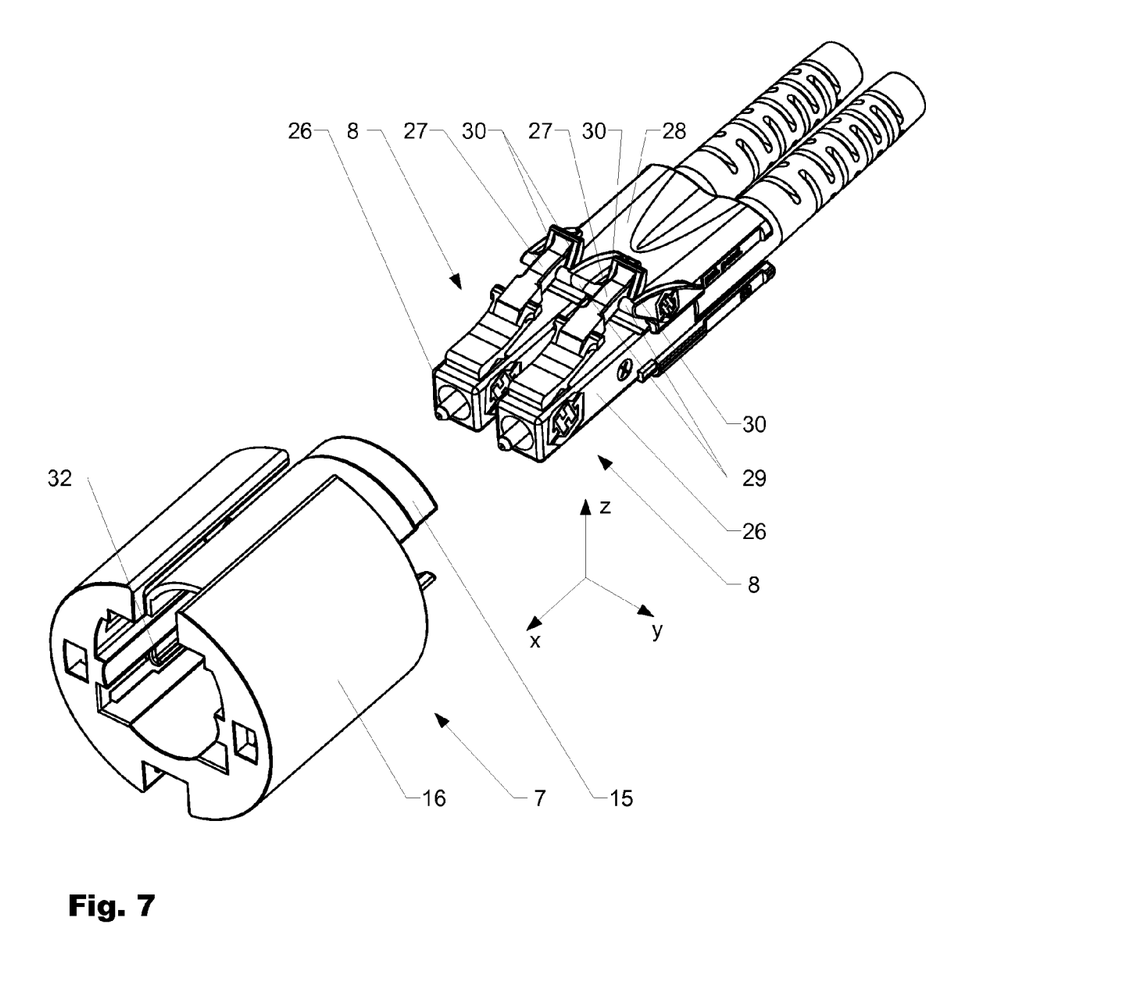
FIG. 7 shows two connectors of a holder for the connectors.

FIG. 1 shows a cable entry 1 with a cable-side plug-in part 2 and a housing-side flange 3 in a plan view in the operatively connected state. FIG. 2 shows a sectional illustration through the cable entry 1 along the section line AA. FIG. 3 shows the cable entry 1 in a perspective, exploded illustration at an angle from the front and from above, and FIG. 4 shows the cable entry 1 in a perspective, exploded illustration at an angle from the rear and from above. FIG. 5 shows the cable-side plug-in part 2 and the housing-side flange 3 in the disassembled state. FIG. 6 shows a control part 9 and a spring 12 in a side view. FIG. 7 shows a holder 7 and two connectors 8 in a perspective illustration at an angle from the front and from above prior to fitting.

The plug-in part 2 has a locking sleeve 4 with an inner thread 5, which interacts with an outer thread 6 of the flange 3 in the coupled state of the cable entry 1 (cf. FIG. 2). Alternatively or in addition, further operative connection means can be provided, if required. In the embodiment shown, the flange 3 has a two-part configuration. An inner flange part 21 is provided for fitting on a housing of an appliance (neither of which is illustrated in any more detail) and has a fitting opening 22, through which a mating piece 19 (for example SFP module) can be operatively connected to the connectors 8. Positioning pins 24 are arranged in an outer flange part 23 and ensure that the plug-in part can only be operatively connected to the flange 3 in one position. The positioning pins 24 engage in corresponding, shaped grooves 25 in the locking sleeve 4 when the plug-in part 2 is plugged onto the flange 3, said grooves being matched in terms of their shape to the movement or to the thread 5, 6.

The holder 7 is arranged in the interior of the locking sleeve 4, said holder serving to accommodate one or more connectors 8. The holder 7 can be configured in such a way that the connectors 8 can be clamped fixedly therein. Other types of fastening, for example adhesive bonding or welding, are possible.

The holder 7 is arranged displaceably in the longitudinal direction (x direction) of the plug-in part 2. A rotation of the holder 7 about the longitudinal direction is not provided in the embodiment shown. The position of the holder 7 and therefore of the connectors 8 is determined by the control part 9, which interacts with the holder 7 via two slotted control links 10 which are opposite one another. The slotted control links 10 are arranged on a cylindrical outer surface 11 of the control part 9 in the embodiment shown and interact with two pins 17 of the holder 7 which engage in said slotted control links radially from the outside. As can be seen in FIGS. 3 and 4, the slotted control links 10 are configured so as to be endless and describe a closed path by virtue of the pins 17 moving endlessly in one direction with respect to the flange 3 during locking and unlocking of the locking sleeve 4. If required, a detent pawl (not illustrated in any more detail) or another means can be provided which defines the direction of rotation and prevents an undesired change in direction. The detent pawl can be formed, for example on the base of a slotted control link 10, in the form of a ramp or a sprung tongue (neither of which is illustrated in any more detail; other configurations are possible). As soon as the associated pin 17 has slid over it, the detent pawl prevents an undesired reversal of the direction of rotation.

The control part 9 is operatively connected to the locking sleeve 4 via the spring 12. For this purpose, the spring has a square 13 at the rear end, said square at the same time a crimping neck 18 for, which engages in a form-fitting manner in a correspondingly shaped cutout 14 in the locking sleeve 4. The spring 12 is designed in such a way that it transmits the rotation of the locking sleeve 4 about the longitudinal axis (x axis) onto the control part 9, which in turn acts on the longitudinal position of the holder 7 of the connectors 8 which is arranged in rotationally fixed fashion in the embodiment shown. As an alternative or in addition, the movement of the locking sleeve can also be transmitted by another mechanical connection, for example a groove and pin, directly or indirectly onto the control element.

If required, one of more seals 34 can be arranged between the locking sleeve 4 and the flange 3, or the locking sleeve 4 and the crimping neck 18, said seals sealing the inner workings of the cable entry 1 with respect to external influences. The constituent parts of the cable entry can be manufactured from plastic and/or metal. In the embodiment shown, the holder 9 and the spring 12 are configured as one component part, which has a rotationally rigid receptacle for the sleeve-shaped crimping neck 18, which in this case is manufactured from metal, at the rear end.

The spring 12 is configured in such a way that it has sufficient torsional rigidity for the rotational movement of the locking sleeve 4 to be transmitted onto the control element 9.

As can be seen in FIG. 2, the holder 8 has double walls in the rear region, in the embodiment shown. An inner part 15 serves to accommodate and actually hold the connectors 8. The pins 17, which engage in the slotted control links 10 from the outside, are arranged on an outer part 16. The outer part 16 surrounds the control element 9 in the fitted position from the outside and can support said control element, if required, for axial guidance and stabilization laterally with respect to the locking sleeve 4. It is generally desirable for the inner workings of the plug-in part to have a certain amount of play such that incorrect positions and inaccuracies can be compensated for.

FIG. 7 illustrates the optical connectors 8 and the holder 7 isolated from one another. The connectors 8 each have a basic body 26 with a locking arm 27 which protrudes rearwards at an angle and upwards and which latches into a mating piece 19 (cf. FIG. 2) whilst interacting therewith. An unlocking element 28, which in this case is in the form of a clamp, is snapped onto the basic body 26 and can be displaced in the longitudinal direction with respect thereto, is operatively connected to the locking arms 27 via an upwardly projecting clip 29. In order that the connector 8 has a small physical height, the clip 29 is not configured so as to be continuous in the embodiment shown and interacts, from the side, with ramps 30 integrally formed on the locking arms 27. By virtue of the unlocking element 28 being displaced towards the rear (x direction), the locking arms 27 are drawn downwards via the ramp 30, with the result that the connector 8 is unlocked and can be removed.

The unlocking element 28 has, laterally, depressions 31, which, in the fitted state, interact with corresponding elevations 32 formed on the inner part 15 of the holder 7. Said elevations are designed in such a way that the connectors 8 can be snapped into them.

FIG. 2 illustrates the plug-in part 2 operatively connected to the socket 3. In this case, the connectors 8 are snapped into the mating piece 19. The mating piece 19 is normally mounted, fixed in position, in the interior of an appliance (not illustrated in any more detail) with respect to the socket 3. Plugging the connectors 8 into the mating piece 19 prevents the holder 7 from unintentionally rotating as well when the plug-in part 2 is operatively connected to the socket 3. If required, as an alternative or in addition, an anti-rotation means can be provided which acts between the flange 3 and the holder 7, for example a pin engages in a groove provided for this purpose running in the longitudinal direction.

FIG. 5 shows a schematic illustration, through the line 33, of the path required for connecting or decoupling the plug-in part 2 to or from the flange 3. In order to connect the plug-in part 2 to the socket 3, said plug-in part is first placed onto the socket 3, with the result that the connectors 8 inserted into the holder 7 are pushed into the mating piece 19 in the longitudinal direction (x direction) as far as a first depth and the outer operative connection means (in the present case the inner thread with the outer thread 5, 6 and the positioning pins 20 with the grooves 25 provided for this purpose) are initially brought into engagement between the locking sleeve 4 and the flange 3. By virtue of the connectors 8 being pushed into the mating piece 19, the holder is prevented from twisting unintentionally in the embodiment shown. Then, the locking sleeve 4 is rotated about the longitudinal axis in the clockwise direction, as a result of which the locking sleeve 4 is fastened on the flange 3. At the same time the control part 9, which is operatively connected to the locking sleeve via the spring 12, is twisted with respect to the holder 7, with the result that the pins 17, which engage in the slotted control link 10 of the control part 9, are moved along the slotted control link 10. As a result, the connectors 8 which have been inserted into the holder 7 are pushed forwards in the axial direction until the locking arms 27 have latched into the cutouts (not illustrated in any further detail) provided for this purpose in the mating piece 19. The slotted control link 10 and the threads 5, 6 definitively determine to what extent the spring 12 is tensioned, or how high the press-in force is.

In order to decouple the plug-in part 2, the locking sleeve 4 is rotated about the x axis in the opposite direction. In this case, the pins 17 are guided back to the initial position on another part of the slotted control link 10. In this case, the holder 7, and with it the unlocking element 28 of the connectors 8, is drawn rearwards in a controlled manner (x direction) and as a result the locking arms 27 are unlocked with respect to the mating piece 19 in the described manner. The locking and unlocking operation can be influenced by a change in the shape of the slotted control link 10.

FIG. 6 illustrates, in isolated form, the control element 9 and the spring 12. It can be seen that, in the embodiment shown, two identical slotted control links 10 are arranged on the outer face 11 on two opposite sides. Said slotted control links have substantially four functional sections, which are grouped as follows, by way of a simplified representation:

1st functional section (a1): This region serves to push the pins 17 or the holder 7 (cf. FIG. 3) forwards (+x direction) until the connectors 8 are latched into the mating piece 19 during the locking process.

2nd functional section (a2): In the end position, the tensioned spring 12 is relieved of tension by the second functional section, which runs substantially in the longitudinal direction, by virtue of the pins 17 being moved in the arrow direction. This means that there are no positive forces acting on the mating piece 19. An associated noise can be used as an audible signal for the termination of the latch-in operation.

3rd functional section (a3): During unlocking, the third functional section serves to draw back the holder 7 or the unlocking element 28 with respect to the mating piece 19, with the result that the locking arms 27 are unlocked and the connector 8 is removed from the mating piece 19.

4th functional section (a4): The fourth functional section serves to relieve the tension on the spring 12 again and to restore the initial situation. If required, a detent pawl or an elastically protruding tongue can be provided in this region, said detent pawl or tongue preventing the pins 17 from moving in the incorrect direction.

Figure 8:
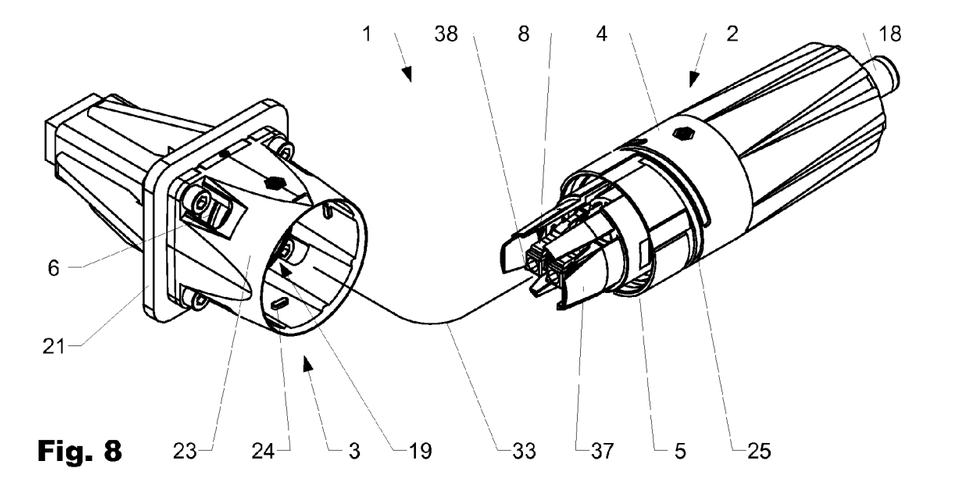
FIG. 8 shows a further embodiment of a cable entry in a perspective illustration.
Figure 9:
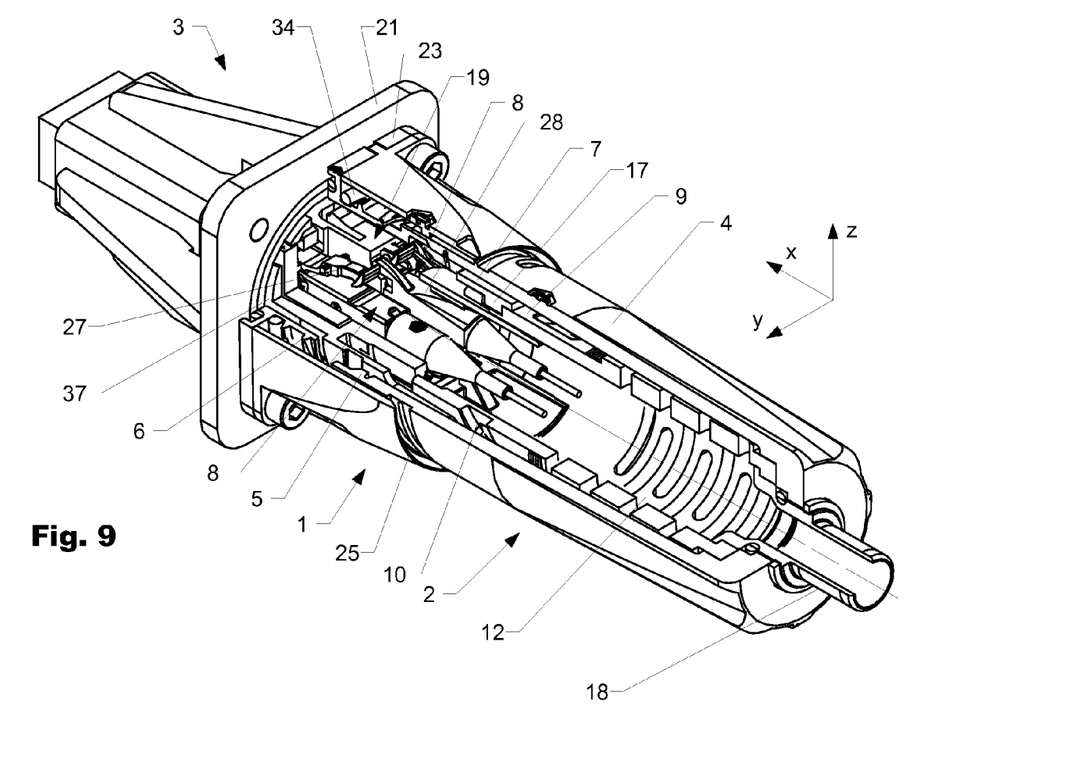
FIG. 9 shows the cable entry shown in FIG. 8 in a partially sectional illustration.
Figure 10:
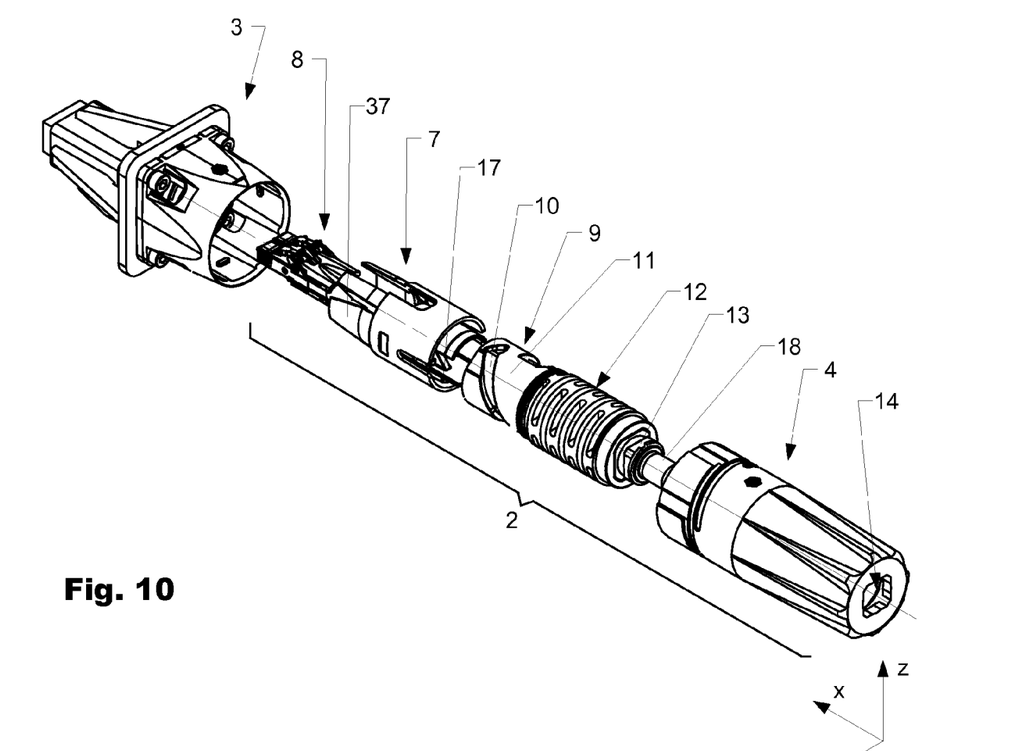
FIG. 10 shows the cable entry shown in FIG. 8 in an exploded illustration.

FIG. 8 shows a further embodiment of a cable entry 1 with a cable-side plug-in part 2 and a housing-side flange 3, in a perspective illustration. The plug-in part 2 and the flange 3 are illustrated separately from one another. The line 33 shows the fitting direction schematically. FIG. 9 shows the plug-in part 2 and the flange 3 in the operatively connected state. However, the locking sleeve 4 is not yet screwed to the flange. The parts are illustrated partially in section in order that an internal view is possible. FIG. 10 shows the cable entry 1 in a perspective, exploded illustration from above and from the front at an angle.

The plug-in part 2 in this case likewise has a locking sleeve 4 with an inner thread 5, which, in the coupled state of the cable entry 1, interacts with an outer thread 6 of the flange 3. As an alternative or in addition, if required, further operative connection means can be provided. In the embodiment shown, the flange 3 has a two-part configuration. An inner flange part 21 is intended to be fitted on a housing of an appliance (neither of which is illustrated in any more detail) and has a fitting opening 22, through which a mating piece 19 (for example SFP module) can be operatively connected to the connectors 8. Positioning pins 24 are arranged in an outer flange part 23 and ensure that the plug-in part can only be operatively connected to the flange 3 in one position. The positioning pins 24 engage in corresponding shaped grooves 25 in the locking sleeve 4 when the plug-in part 2 is plugged onto the flange 3, said grooves being matched in terms of shape to the movement or the thread 5, 6.

The holder 7 is arranged in the interior of the locking sleeve 4, said holder serving to accommodate one or more connectors 8. The holder 7 can be configured in such a way that the connectors 8 can be clamped fixedly therein. Other types of fastening, for example adhesive bonding or welding are possible.

The holder 7 is arranged displaceably in the longitudinal direction (x direction) of the plug-in part 2. A rotation of the holder 7 about the longitudinal direction is not provided in the embodiment shown. The position of the holder 7 and therefore the connectors 8 with respect to the locking sleeve 4 is determined by the control part 9, which interacts with the holder 7 via two mutually opposite slotted control links 10, which in this case are configured so as to have a single start. The slotted control links 10 are arranged on a cylindrical outer face 11 of the control part 9 in the embodiment shown and interact with two pins 17 of the holder 7, said pins engaging in said slotted control links radially from the outside.

As can be seen from FIG. 10, the slotted control links 10 in this embodiment have a single start, in contrast to the embodiment shown in FIGS. 1 to 7, i.e. they do not describe a closed path, in contrast to the embodiment. The pins 17 therefore follow the same profile, in a different direction, during locking and unlocking of the locking sleeve 4 with respect to the flange 3.

The control part 9 is operatively connected to the locking sleeve 4 via the spring 12. For this purpose, the spring has a square 13 at the rear end, said square at the same time having a crimping neck 18. The square 13 engages in a correspondingly shaped cutout 14 in the locking sleeve 4 in a form-fitting manner in the assembled state. The spring 12 is designed in such a way that it transmits the rotation of the locking sleeve 4 about the longitudinal axis (x axis) onto the control part 9, which in turn acts on the longitudinal position of the holder 7 of the connectors 8, said holder being arranged in rotationally fixed fashion in the embodiment shown. As an alternative or in addition, the movement of the locking sleeve can also be transmitted directly or indirectly onto the control element by means of another mechanical connection, for example groove and pin.

The component parts of the cable entry can be manufactured from plastic and/or metal. In the embodiment shown, the holder 9 and the spring 12 are formed as one component part, which has a rotationally rigid receptacle for the sleeve-shaped crimping neck 18, which in this case is manufactured from metal, at the rear end. The spring 12 is configured in such a way that it has sufficient torsional rigidity in such a way that the rotary movement of the locking sleeve 4 is transmitted onto the control element 9. Said spring comprises tangentially running spring regions 35, which are operatively connected via webs 36, which are arranged with an offset with respect to one another and run axially (cf. FIG. 11 as well).

Centering means 37 which protrude axially forwards and which align the holder 7, and with it the connectors 8, with respect to the flange 3 or the mating piece 19 thereof when the plug-in part 2 is inserted into the flange 3 and bring said holder into position for the subsequent operative connection are formed at the front end of the holder 7. The centering means 37 can also have a different configuration. In the embodiment shown, they serve at the same time as protection for the connectors 8, or the contact means (ferrules) 38 thereof with respect to external influences.

During the operative connection, the centering means 37 serve to align the holder 7 and connectors 8 with respect to the flange 3. Then, the locking sleeve is pushed in the direction of the flange 3 until the positioning pins 24 engage in the grooves 25. As a result, the spring 12 is tensioned until the connectors 8 snap into their mating piece 19. Then, the locking sleeve 4 is rotated with respect to the flange 3, with the result that the threads 5, 6 engage in one another. At the same time, the spring 12 is relieved of tension by virtue of the pins 17 being moved along the groove 10. This means that the connectors 8 are relieved of the force of the spring 12 in the operatively connected state. This is achieved by virtue of the pitch of the groove 10 being selected to be greater than the pitch of the threads 5, 6. The residual force can be determined by the selection of the pitch of the groove 10.

Figure 11:
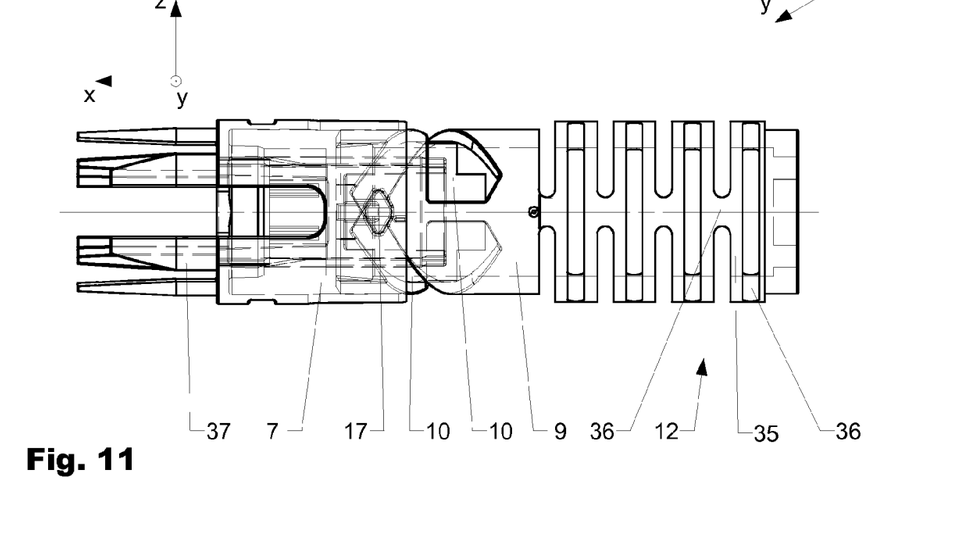
FIG. 11 shows a second control part in a side view.

FIG. 11 shows the holder 7 and the control part 7 and the spring 12 in accordance with the embodiment shown in FIGS. 8 to 10 in a side view. The non-visible lines are illustrated by dashed lines. The two opposite slotted control links 10, which are configured in the form of grooves and are opposite one another at 180° have, at least in regions, a pitch which is greater than the pitch of the threads 5, 6 (FIG. 8). The pins 17, which define the axial position of the holder 7 with respect to the control part 9 depending on the rotary angle, engage in the slotted control links 10 from the outside.

In the embodiment shown in FIGS. 1 to 7, the slotted control link 10 is configured in such a way that first the spring 12 is tensioned by the rotation of the locking sleeve 4 until the connectors are latched in. Then, the spring 12 is relieved of tension by a functional section provided for this purpose (cf. FIG. 6). In contrast to this, in the embodiment shown in FIGS. 8 to 11, the spring 12 is tensioned by virtue of the locking sleeve 4 being plugged into the flange 3, with the result that the connectors 8 are operatively connected. Then, the spring is relieved of tension again by the locking sleeve 4 being rotated until the locking sleeve is locked completely with respect to the socket 3.

The invention claimed is:

1. A cable entry comprising:
a flange; a plug-in part which is suitable for being operatively connected to the flange, the plug-in part having a locking sleeve and a holder for a connector; wherein the holder is operatively connected to the locking sleeve via a slotted control link, the slotted control link being configured so that a rotation of the locking sleeve about a longitudinal axis of the plug-in part brings about an axial displacement of the holder with respect to the slotted control link in a longitudinal direction; wherein the slotted control link is arranged on a control part, which is arranged displaceably in the longitudinal direction with respect to the locking sleeve.

2. The cable entry of claim 1, wherein the slotted control link is configured endlessly such that the holder performs different longitudinal movements during locking and unlocking of the locking sleeve with respect to the flange in such a way that the connectors are coupled and decoupled to and from the mating piece.

3. The cable entry of claim 2, wherein the slotted control link consists substantially of four functional sections (a1, a2, a3, a4).

4. The cable entry of claim 1, wherein the slotted control link is configured with a single start.

5. The cable entry of claim 1, wherein the control part is operatively connected to the locking sleeve via a spring.

6. The cable entry of claim 1, wherein the holder accommodates a connector, which has a basic body and a locking arm which is arranged thereon and which can be unlocked via an unlocking element.

7. The cable entry of claim 1, wherein the locking sleeve is operatively connected to the flange via a thread.

8. The cable entry of claim 7, wherein the slotted control link includes a pitch greater than a pitch of the thread arranged between the flange and the locking sleeve.

9. The cable entry of claim 1, wherein the holder for the connectors is arranged in rotationally fixed fashion.

10. The cable entry of claim 1, wherein the control part is arranged in rotationally fixed fashion with respect the locking sleeve via an operative connection means.

* * * * *